US008593595B2

(12) United States Patent
Park et al.

(10) Patent No.: US 8,593,595 B2
(45) Date of Patent: Nov. 26, 2013

(54) COLOR FILTER USING SURFACE PLASMON AND LIQUID CRYSTAL DISPLAY DEVICE

(75) Inventors: Se-Young Park, Goyang (KR);
Jeong-Hyun Kim, Seoul (KR);
Sung-Chol Yi, Goyang (KR);
Chang-Gu Lee, Paju (KR);
Cheol-Hwan Lee, Suwon (KR)

(73) Assignee: LG Display Co., Ltd., Seoul (KR)

( * ) Notice: Subject to any disclaimer, the term of this patent is extended or adjusted under 35 U.S.C. 154(b) by 295 days.

(21) Appl. No.: 12/916,324

(22) Filed: Oct. 29, 2010

(65) Prior Publication Data

US 2011/0102716 A1 May 5, 2011

(30) Foreign Application Priority Data

Oct. 30, 2009 (KR) .................. 10-2009-0104526

(51) Int. Cl.
*G02F 1/1335* (2006.01)
(52) U.S. Cl.
USPC .......................................... 349/106; 349/105
(58) Field of Classification Search
USPC ......................... 349/105, 106; 359/585, 589
See application file for complete search history.

(56) References Cited

U.S. PATENT DOCUMENTS

| | | | |
|---|---|---|---|
| 5,451,980 A | 9/1995 | Simon et al. | |
| 5,570,139 A | 10/1996 | Wang | |
| 5,973,316 A | 10/1999 | Ebbesen et al. | |
| 5,986,808 A | 11/1999 | Wang | |
| 5,991,000 A | 11/1999 | Shimabukuro et al. | |
| 6,040,936 A | 3/2000 | Kim et al. | |
| 6,097,456 A | 8/2000 | Wang | |
| 6,122,091 A | 9/2000 | Russell et al. | |
| 6,236,033 B1 | 5/2001 | Ebbesen et al. | |
| 6,285,020 B1 | 9/2001 | Kim et al. | |
| 6,441,298 B1 | 8/2002 | Thio | |
| 6,992,826 B2 | 1/2006 | Wang | |
| 7,085,220 B2 | 8/2006 | Fujikata et al. | |
| 7,110,154 B2 | 9/2006 | Ballato et al. | |
| 7,206,114 B2 | 4/2007 | Ballato et al. | |
| 7,248,297 B2 | 7/2007 | Catrysse et al. | |
| 7,417,219 B2 | 8/2008 | Catrysse et al. | |
| 7,420,156 B2 | 9/2008 | Kim et al. | |
| 2004/0239837 A1* | 12/2004 | Hong et al. .................. | 349/106 |
| 2006/0038953 A1* | 2/2006 | Moriya ........................ | 349/144 |
| 2006/0221027 A1* | 10/2006 | Ishihara et al. ............. | 345/88 |
| 2006/0284829 A1 | 12/2006 | Moriyama et al. | |
| 2007/0008602 A1* | 1/2007 | Ballato et al. ............... | 359/245 |
| 2008/0030660 A1* | 2/2008 | Roth et al. .................. | 349/106 |
| 2009/0027329 A1 | 1/2009 | Choi et al. | |
| 2009/0034055 A1 | 2/2009 | Gibson | |

(Continued)

FOREIGN PATENT DOCUMENTS

WO    WO 2007118895 A1 * 10/2007

*Primary Examiner* — Michael Caley
(74) *Attorney, Agent, or Firm* — Birch, Stewart, Kolasch & Birch, LLP

(57) ABSTRACT

Discussed are a color filter using a surface plasmon and a liquid crystal display (LCD) device, the color filter capable of enhancing a transmittance ratio of an LC panel by having a 3D pattern structure of a transmissive pattern for selectively transmitting light of a specific wavelength, and capable of simplifying entire processes. According to the color filter using a surface plasmon and the LCD device, not only three colors of RGB but also multi-colors can be implemented, and color reproduction can be enhanced by optimizing arrangement of the transmissive pattern according to the number of colors to be implemented.

8 Claims, 11 Drawing Sheets

(56) References Cited

U.S. PATENT DOCUMENTS

| | | |
|---|---|---|
| 2009/0087793 A1 | 4/2009 | Kim et al. |
| 2009/0091644 A1 | 4/2009 | Mackey |
| 2010/0059663 A1* | 3/2010 | Desieres ............ 250/226 |
| 2010/0091225 A1* | 4/2010 | Cho et al. .......... 349/105 |

* cited by examiner

COLOR FILTER USING SURFACE PLASMON AND LIQUID CRYSTAL DISPLAY DEVICE

CROSS-REFERENCE TO RELATED APPLICATION

Pursuant to 35 U.S.C. §119(a), this application claims the benefit of earlier filing date and right of priority to Korean Application 10-2009-0104526, filed on Oct. 30, 2009, the contents of which are incorporated by reference herein in its entirety.

BACKGROUND OF THE INVENTION

1. Field of the Invention

The present invention relates to a color filter using a surface plasmon and a liquid crystal display (LCD) device, and more particularly, to a color filter using a surface plasmon and having a three-dimensional (3D) pattern structure provided with a transmissive pattern for selectively transmitting light of a specific wavelength, and an LCD device.

2. Discussion of the Related Art

As concerns about an information displays and demands for portable information media are increased, research and commercialization of flat panel displays (FPD) replacing the conventional display apparatus, Cathode Ray Tubes (CRT) are actively ongoing. One of these flat panel displays, a Liquid Crystal Display (LCD) device serves to display an image by using optical anisotropy of a liquid crystal (LC). Owing to an excellent resolution, color reproduction characteristic, and picture quality, the LCD device is being actively applied to a notebook, a desk top monitor, etc.

The LCD device is largely comprised of a color filter substrate, an array substrate, and an LC layer interposed between the color filter substrate and the array substrate.

The LCD device is fabricated through a plural number of mask processes (i.e., photo lithography process). Accordingly, required is a method for reducing the number of mask processes for enhanced productivity.

Hereinafter, a structure of the related art LCD device will be explained in more detail with reference to FIG. 1.

FIG. 1 is a disassembled perspective view schematically showing a structure of the related art LCD.

As shown in FIG. 1, the LCD device largely comprises a color filter substrate 5, an array substrate 10, and an LC layer 30 interposed between the color filter substrate 5 and the array substrate 10.

The color filter substrate 5 consists of a color filter (C) composed of a plurality of sub color filters 7 for implementing red, green and blue (RGB) colors, a black matrix 6 for dividing the sub color filters 7 from each other and shielding light passing through the LC layer 30, and a transparent common electrode 8 for applying a voltage to the LC layer 30.

The array substrate 10 consists of a plurality of gate lines 16 and data lines 17 arranged in horizontal and vertical directions to define a plurality of pixel regions (P), Thin Film Transistors (TFT), switching devices formed at intersections between the gate lines 16 and the data lines 17, and pixel electrodes 18 formed in the pixel regions (P).

The color filter substrate 5 and the array substrate 10 facing each other are bonded to each other by a sealant (not shown) formed on an outer periphery of an image display region, thereby constituting an LC panel. The color filter substrate 5 and the array substrate 10 are bonded to each other by alignment keys (not shown) formed at the color filter substrate 5 or the array substrate 10.

In order to prevent light leakage due to an alignment error when bonding the two substrates to each other, a line width of the black matrix is set to be wide, thereby obtaining an alignment margin. This may reduce an aperture ratio of the LC panel.

The general color filter used in the LCD device implements colors by absorbing light of unnecessary colors for disappearance with using pigments or dyes, and by selectively transmitting light of desired colors. This may allow only one of RGB colors, from white incident light, to be transmitted to one sub-pixel. Accordingly, it is difficult to have a transmittance ratio more than 30%. Due to this low transmittance ratio of the LC panel, power consumption by a backlight is increased.

FIG. 2 is an exemplary view schematically showing a transmittance ratio of the LC panel when applying a color filter using a general pigment dispersing method.

Referring to FIG. 2, as light incident from a backlight has a decreased optical amount decreased while sequentially passing through a polarizer, a TFT array, an LC and a color filter, a transmittance ratio is reduced to 5% or less than.

Here, the polarizer, the TFT array and the color filter approximately have transmittance ratios of ~40%, 45~55% and ~25%, respectively.

The general color filter is fabricated with complicated processes since it repeatedly undergoes color resist coating, exposure to light, development and hardening processes according to each color.

Furthermore, in order to fabricate the color filter on the color filter substrate, color filter processing lines have to be implemented separately from TFT processing lines. This may increase line installation costs.

SUMMARY OF THE INVENTION

Therefore, an object of the present invention is to provide a color filter using a surface plasmon capable of enhancing an aperture ratio and a transmittance ratio of an LC panel, by using a surface plasmon instead of using the general dyes or pigments, and a liquid crystal display (LCD) device.

Another object of the present invention is to provide a color filter using a surface plasmon capable of implementing multi-colors, and capable of enhancing color reproduction by optimizing arrangement of a transmissive pattern according to the number of colors, and an LCD device.

To achieve these and other advantages and in accordance with the purpose of the present invention, as embodied and broadly described herein, there is provided a color filter using a surface plasmon, the color filter comprising: a first sub-color filter for implementing a red color by forming a first sub-wavelength transmissive pattern having a predetermined period on a first metal layer; a second sub-color filter for implementing a green color by forming a second sub-wavelength transmissive pattern having a predetermined period on a second metal layer; and a third sub-color filter for implementing a blue color by forming a third sub-wavelength transmissive pattern having a predetermined period on a third metal layer, wherein the first to third sub-color filters are tangent to one another in a hexagonal shape, and lines connecting centers of the first to third sub-color filters to one another form a triangle.

According to another aspect of the present invention, there is provided a color filter using a surface plasmon, the color filter comprising: a first sub-color filter for implementing a red color by forming a first sub-wavelength transmissive pattern having a predetermined period on a first metal layer; a second sub-color filter for implementing a green color by forming a second sub-wavelength transmissive pattern having a predetermined period on a second metal layer; a third sub-color filter for implementing a blue color by forming a third sub-wavelength transmissive pattern having a predetermined period on a third metal layer; and a fourth sub-color filter for implementing a yellow color or a cyan color by forming a fourth sub-wavelength transmissive pattern having a predetermined period on a fourth metal layer, wherein the first to fourth sub-color filters are tangent to one another in a quadrangular shape, and lines connecting centers of the first to fourth sub-color filters to one another form a quadrangle.

According to still another aspect of the present invention, there is provided a color filter using a surface plasmon, the color filter comprising: a first sub-color filter for implementing a red color by forming a first sub-wavelength transmissive pattern having a predetermined period on a first metal layer; a second sub-color filter for implementing a green color by forming a second sub-wavelength transmissive pattern having a predetermined period on a second metal layer; a third sub-color filter for implementing a blue color by forming a third sub-wavelength transmissive pattern having a predetermined period on a third metal layer; a fourth sub-color filter for implementing a yellow color by forming a fourth sub-wavelength transmissive pattern having a predetermined period on a fourth metal layer; and a fifth sub-color filter for implementing a cyan color by forming a fifth sub-wavelength transmissive pattern having a predetermined period on a fifth metal layer, wherein four of the first to fifth sub-color filters are tangent to one another in a quadrangular shape, and the rest one sub-color filter is positioned inside the quadrangle in a diamond shape.

To achieve these and other advantages and in accordance with the purpose of the present invention, as embodied and broadly described herein, there is also provided a liquid crystal display (LCD) device, comprising: a first substrate; a color filter formed on the first substrate, for implementing RGB colors by forming, on first to third metal layers, first to third sub-wavelength transmissive patterns each having a predetermined period; a thin film transistor formed on the first substrate having the color filter formed thereon; and a second substrate bonded to the first substrate with facing the first substrate, wherein the first to third sub-color filters are tangent to one another in a hexagonal shape, and lines connecting centers of the first to third sub-color filters to one another form a triangle.

According to another aspect of the present invention, there is provided a liquid crystal display (LCD) device, comprising: a first substrate; a color filter formed on the first substrate, for implementing RGBY or RGBC colors by forming, on first to fourth metal layers, first to fourth sub-wavelength transmissive patterns each having a predetermined period; a thin film transistor formed on the first substrate having the color filter formed thereon; and a second substrate bonded to the first substrate with facing the first substrate, wherein the first to fourth sub-color filters are tangent to one another in a quadrangular shape, and lines connecting centers of the first to fourth sub-color filters to one another form a quadrangle.

According to still another aspect of the present invention, there is provided a liquid crystal display (LCD) device, comprising: a first substrate; a color filter formed on the first substrate, for implementing RGBYC colors by forming, on first to fifth metal layers, first to fifth sub-wavelength transmissive patterns each having a predetermined period; a thin film transistor formed on the first substrate having the color filter formed thereon; and a second substrate bonded to the first substrate with facing the first substrate, wherein four of the first to fifth sub-color filters are tangent to one another in a quadrangular shape, and the rest one sub-color filter is positioned inside the quadrangle in a diamond shape.

According to yet still another aspect of the present invention, there is provided a liquid crystal display (LCD) device, comprising: a first substrate; a color filter formed on the first substrate, for implementing RGBYC colors by forming, on first to fifth metal layers, first to fifth sub-wavelength transmissive patterns each having a predetermined period; a thin film transistor formed on the first substrate having the color filter formed thereon; and a second substrate bonded to the first substrate with facing the first substrate, wherein the first to fifth sub-color filters are sequentially arranged in a quadrangular shape to have a form of stripes.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

Hereinafter, a color filter using a surface plasmon and a liquid crystal display (LCD) device according to the present invention will be explained in more detail with reference to the attached drawings.

The general method for enhancing a transmittance ratio of an LC panel by improving an aperture ratio of an array substrate has many limitations. Accordingly, the general paradigm has to be changed into a new paradigm for enhancing a transmittance ratio of an LC panel by removing a color filter.

For this, has been proposed a method for filtering light by forming a transmissive pattern at a metal layer so that light of a specific wavelength can be selectively transmitted. The present invention is to provide a color filter capable of transmitting not only RGB colors but also multi-colors by forming a metal layer color filter using a surface plasmon.

Figure 1:
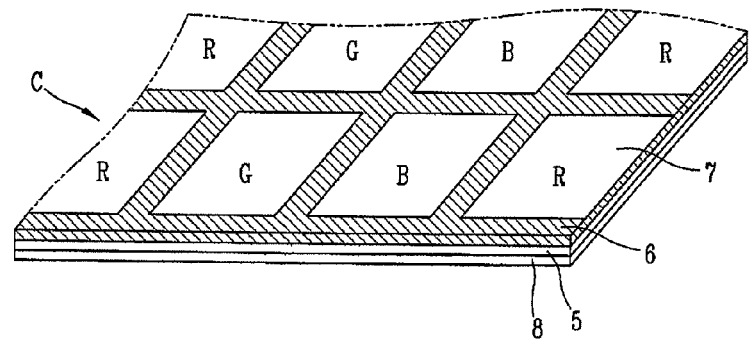
FIG. 1 is a disassembled perspective view schematically showing a structure of a liquid crystal display (LCD) device in accordance with the related art.
Figure 1:
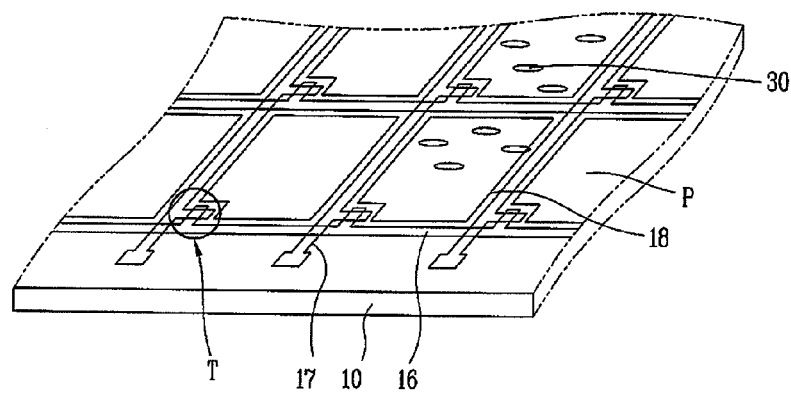
Figure 2:
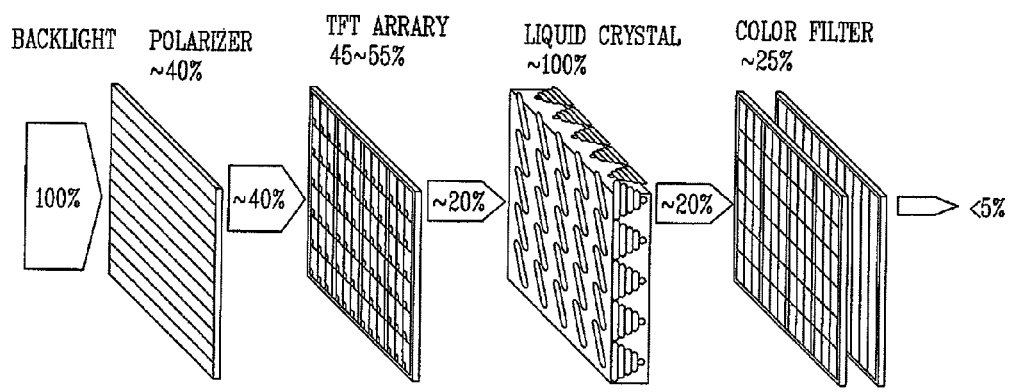
FIG. 2 is an exemplary view schematically showing a transmittance ratio of an LC panel when applying a color filter using a general pigment dispersing method.
Figure 3A:
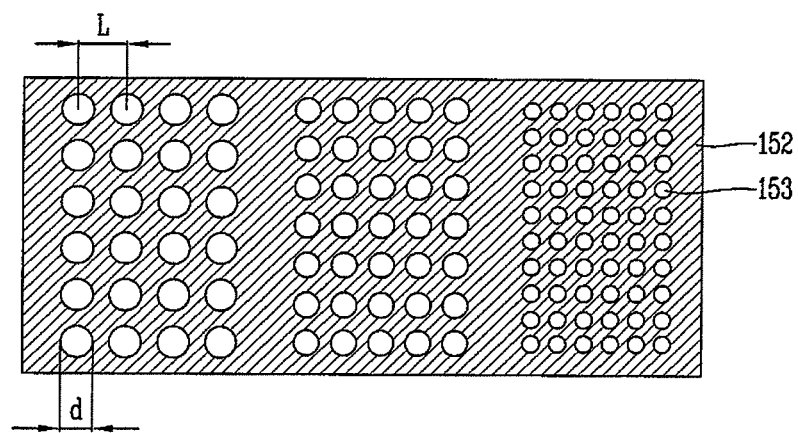
FIGS. 3A and 3B are respectively a planar view and a sectional view, which schematically show a structure of a color filter using a surface plasmon according to the present invention.
Figure 3B:
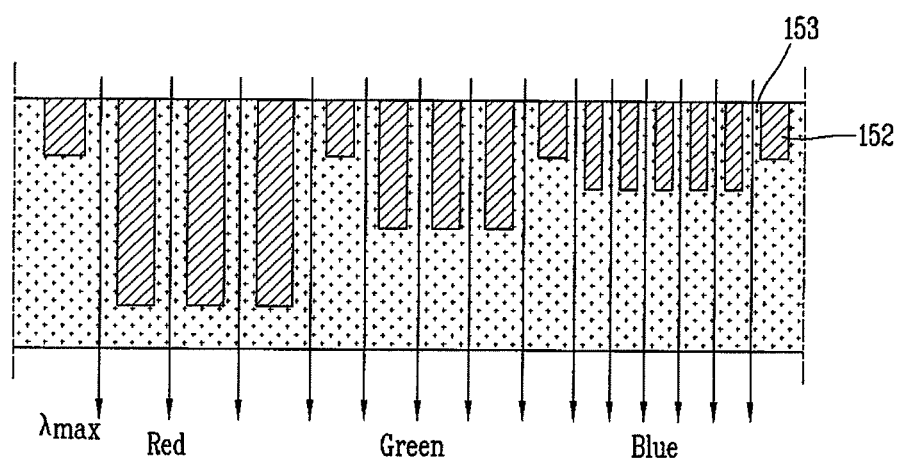

FIGS. 3A and 3B are respectively planar and sectional views schematically showing a structure of a color filter fabricated by using a surface plasmon phenomenon according to the present invention, which implement RGB colors for convenience.

Referring to FIG. 3, a sub-wavelength transmissive pattern 153 having a predetermined period (L) is formed on a metal layer 152. An electric field of incident light having both a wavelength of near infrared light and a wavelength of visible light is coupled to a plasmon. Accordingly, only light of specific wavelengths is transmitted, and light of other wavelengths is reflected, thereby obtaining RGB colors.

For instance, if a sub-wavelength hole pattern having a predetermined period (L) is formed on a silver film, selected RGB light of a specific wavelength is transmitted according to a size (d) and a period (L) of a hole, thereby implementing RGB colors. A greater amount of light than a hole area may be transmitted by absorbing light near the hole.

In order to implement a color of a high purity, the size (d), the period (L) and the arrangement of the hole may be controlled. Each thickness of the metal layer 152 corresponding to each wavelength may be differently controlled. However, the present invention is not limited to this.

For your reference, the plasmon refers to a quasiparticle that free electrons induced on a surface of metal oscillate collectively by an electric field of incident light. A surface plasmon indicates that the plasmon partially exists on the metal surface, which corresponds to an electromagnetic wave that proceeds along an interface between the metal and a dielectric.

The surface plasmon phenomenon refers to forming light of a specific wavelength as light of a specific wavelength incident onto a surface of metal having a nano-sized periodic hole pattern resonates with free electrons on the metal surface. Only light of specific wavelengths is made to transmit through the hole, and light of other wavelengths is made to be reflected from the metal surface.

Multi-colors may be extracted from white light by selectively transmitting desired light by controlling a period of a transmissive pattern. Here, the transmitted light has a wavelength corresponding to about 1.7~2 times of a period of the transmissive pattern. Accordingly, it is possible to transmit light of a desired wavelength by controlling the period of the transmissive pattern.

The transmissive pattern may have not only a circular shape such as a hole, but also various shapes such as an oval shape, a quadrangular shape, a triangular shape, and a slit shape. The hole may have a diameter of 100~300 nm, and a period of 300~700 nm. In order to transmit blue light of a wavelength of 436 nm, the hole has a period of 300 nm and a size of 155 nm. In order to transmit green light of a wavelength of 538 nm, the hole has a period of 450 nm and a size of 180 nm. And, in order to transmit red light of a wavelength of 627 nm, the hole has a period of 550 nm and a size of 225 nm.

The hole pattern having a specific period and size is formed on the metal layer, and the metal layer having the hole pattern is used as a color filter using a surface plasmon occurring from the metal layer. The color filter is applied to an LCD device, thereby implementing colors.

The general color filter is formed on an upper substrate, a color filter substrate. However, the color filter using a surface plasmon according to the present invention may be formed on a lower array substrate, or outside the lower array substrate.

More concretely, the general color filter using pigments or dyes can not undergo a high temperature process. On the other hand, the color filter using a surface plasmon according to the present invention may undergo a high temperature process, because the metal layer serves as the color filter. This may allow a thin film transistor to be fabricated on the metal layer through the high temperature process. Furthermore, since the color filter is formed at the lower array substrate, can be solved the general problem, decrease of an aperture ratio occurring as an alignment margin is obtained when bonding the upper and lower substrates to each other.

Especially, in the present invention, the color filter is formed on the array substrate having a TFT. This may simplify the entire processes, and allow the upper color filter to be removed.

Figure 4:
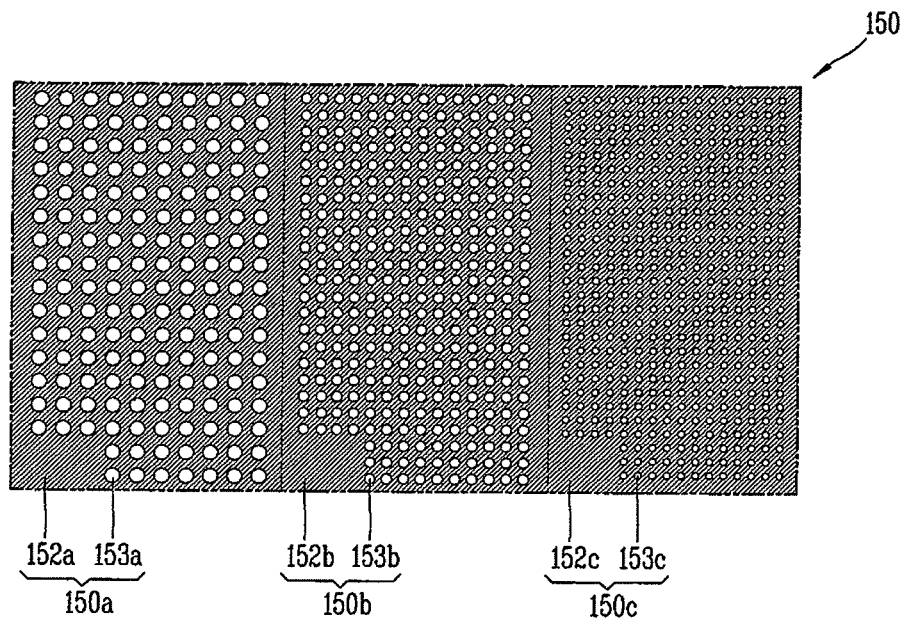
FIG. 4 is a planar view schematically showing one structure of a color filter according to a first embodiment of the present invention.

FIG. 4 is a planar view schematically showing one structure of a color filter according to a first embodiment of the present invention, in which RGB sub-color filters each having a quadrangular shape are arranged in the form of stripes.

FIG. 4 shows a color filter with respect to one pixel composed of sub-color filters corresponding to red, green and blue colors from the left side. However, the present invention is not limited to this.

As shown, the color filter 150 according to the first embodiment of the present invention comprises a first sub-color filter 150*a* for implementing a red color by transmitting red light, a second sub-color filter 150*b* for implementing a green color by transmitting green light, and a third sub-color filter 150*c* for implementing a blue color by transmitting blue light.

The first to third sub-color filters 150*a*, 150*b* and 150*c* implement three colors of RGB by transmitting light of RGB wavelengths and reflecting light of other wavelengths. More concretely, first to third sub-wavelength transmissive patterns 153*a*, 153*b* and 153*c* having predetermined periods are formed on first to third metal layers 152*a*, 152*b* and 152*c*, respectively. And, an electric field of incident light having both a wavelength of near infrared light and a wavelength of visible light is coupled to a plasmon. Accordingly, only light of specific wavelengths is transmitted, and light of other wavelengths is reflected, thereby obtaining three colors of RGB.

Here, the transmitted light has a wavelength corresponding to about 1.7~2 times of a grating period, i.e., the period of the first to third transmissive patterns 153*a*, 153*b* and 153*c*. As aforementioned, the first to third transmissive patterns 153*a*, 153*b* and 153*c* may have not only a circular shape such as holes, but also various shapes such as an oval shape, a quadrangular shape, a triangular shape, and a slit shape.

The first to third metal layers 152*a*, 152*b* and 152*c* may be formed of aluminum, molybdenum, copper, gold, silver, chrome, etc.

The first to third transmissive patterns 153a, 153b and 153c are formed in pixel regions except for a region where a gate line, a data line, and a TFT are formed.

The color filter 150 according to the first embodiment of the present invention has a form of stripes as the first to third sub-color filters 150a, 150b and 150c each having a quadrangular shape are sequentially arranged. However, the present invention is not limited to this. That is, the sub-color filters for implementing RGB colors may be arranged in a triangular shape.

Figure 5:
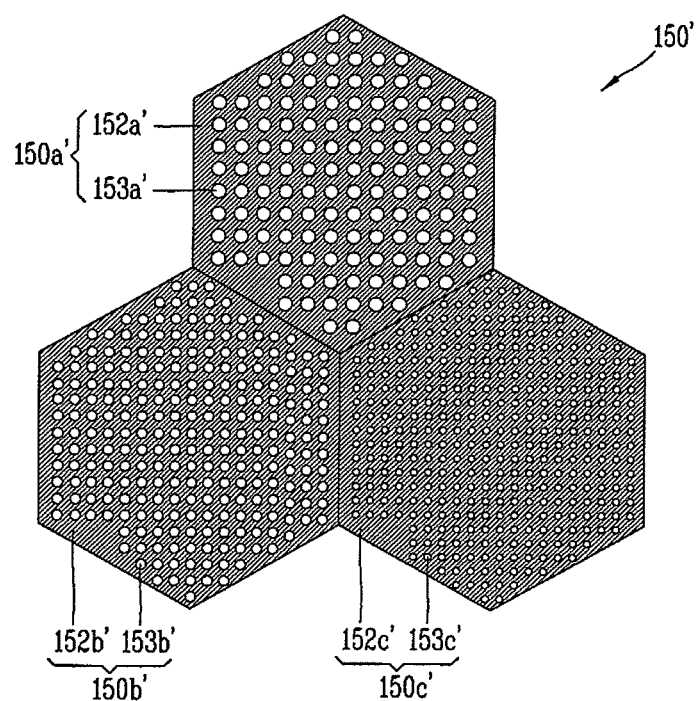
FIG. 5 is a planar view schematically showing another structure of the color filter according to a first embodiment of the present invention.

FIG. 5 is a planar view schematically showing another structure of the color filter according to the first embodiment of the present invention, in which RGB sub-color filters each having a hexagonal shape are arranged in a triangular shape.

FIG. 5 shows a color filter with respect to one pixel composed of sub-color filters corresponding to red, green and blue colors from the left side. However, the present invention is not limited to this.

The color filter of FIG. 5 according to the first embodiment of the present invention has the same configuration as the color filter of FIG. 4 according to the first embodiment of the present invention except for the shape and the arrangement.

As shown, the color filter 150' according to the first embodiment of the present invention comprises a first sub-color filter 150a' for implementing a red color by transmitting red light, a second sub-color filter 150b' for implementing a green color by transmitting green light, and a third sub-color filter 150c' for implementing a blue color by transmitting blue light.

The first to third sub-color filters 150a', 150b' and 150c' implement three colors of RGB by transmitting light of RGB wavelengths and reflecting light of other wavelengths. More concretely, first to third sub-wavelength transmissive patterns 153a', 153b' and 153c' having predetermined periods are formed on first to third metal layers 152a', 152b' and 152c', respectively. And, an electric field of incident light having both a wavelength of near infrared light and a wavelength of visible light is coupled to a plasmon. Accordingly, only light of specific wavelengths is transmitted, and light of other wavelengths is reflected, thereby obtaining three colors of RGB.

The first to third sub-color filters 150a', 150b' and 150c' of the color filter 150' according to the first embodiment are tangent to one another in a hexagonal shape, and lines connecting centers of the first to third sub-color filters to one another form a triangle.

However, the present invention is not limited to the three colors of RGB, but may be also applicable to four colors implemented as yellow (Y) or cyan (C) is added to the three colors of RGB.

Figure 6:
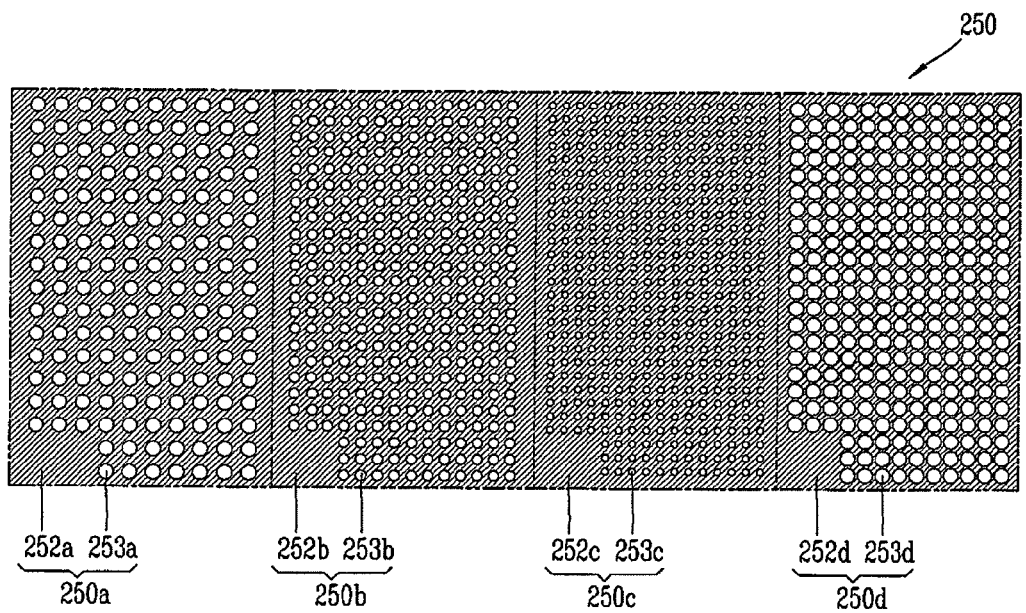
FIG. 6 is a planar view schematically showing one structure of a color filter according to a second embodiment of the present invention.

FIG. 6 is a planar view schematically showing one structure of a color filter according to a second embodiment of the present invention, in which RGBY (or RGBC) sub-color filters each having a quadrangular shape are arranged in the form of stripes.

FIG. 6 shows a color filter with respect to one pixel composed of sub-color filters corresponding to red, green, blue, and yellow colors from the left side. However, the present invention is not limited to this.

As shown, the color filter 250 according to the second embodiment of the present invention comprises a first sub-color filter 250a for implementing a red color by transmitting red light, a second sub-color filter 250b for implementing a green color by transmitting green light, a third sub-color filter 250c for implementing a blue color by transmitting blue light, and a fourth sub-color filter 250d for implementing a yellow color by transmitting yellow light.

As aforementioned, the fourth sub-color filter 250d may implement a cyan color by transmitting cyan light.

The first to fourth sub-color filters 250a, 250b, 250c and 250d implement four colors of RGBY or RGBC by transmitting light of RGBY or RGBC wavelengths and reflecting light of other wavelengths. More concretely, first to fourth sub-wavelength transmissive patterns 253a, 253b, 253c and 253d having predetermined periods are formed on first to fourth metal layers 252a, 252b, 252c and 252d, respectively. And, an electric field of incident light having both a wavelength of near infrared light and a wavelength of visible light is coupled to a plasmon. Accordingly, only light of RGBY or RGBC wavelengths is transmitted, and light of other wavelengths is reflected, thereby obtaining four colors of RGBY or RGBC.

Here, the transmitted light has a wavelength corresponding to about 1.7~2 times of a grating period, i.e., the period of the first to fourth transmissive patterns 253a, 253b, 253c and 253d. As aforementioned, the first to fourth transmissive patterns 253a, 253b, 253c and 253d may have not only a circular shape such as holes, but also various shapes such as an oval shape, a quadrangular shape, a triangular shape, and a slit shape.

The first to fourth metal layers 252a, 252b, 252c and 252d may be formed of aluminum, molybdenum, copper, gold, silver, chrome, etc.

The first to fourth transmissive patterns 253a, 253b, 253c and 253d are formed in pixel regions except for a region where a gate line, a data line, and a TFT are formed.

The color filter 250 according to the second embodiment of the present invention has a form of stripes as the first to fourth sub-color filters 250a, 250b, 250c and 250d each having a quadrangular shape are sequentially arranged. However, the present invention is not limited to this. That is, the sub-color filters for implementing four colors of RGBY or RGBC may be arranged in a quadrangular shape.

Figure 7:
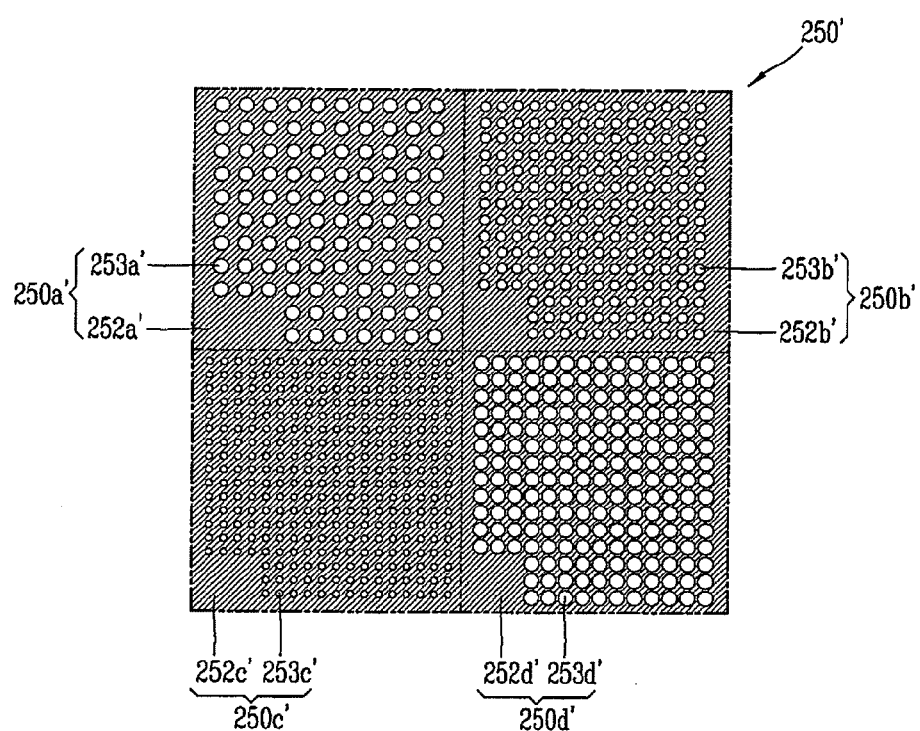
FIG. 7 is a planar view schematically showing another structure of the color filter according to a second embodiment of the present invention.

FIG. 7 is a planar view schematically showing another structure of the color filter according to the second embodiment of the present invention, in which quadrangular RGBY or RGBC sub-color filters are arranged in a quadrangular shape.

The color filter of FIG. 7 according to the second embodiment of the present invention has the same configuration as the color filter of FIG. 6 according to the second embodiment of the present invention except for the shape and the arrangement.

As shown, the color filter 250' according to the second embodiment of the present invention comprises a first sub-color filter 250a' for implementing a red color by transmitting red light, a second sub-color filter 250b' for implementing a green color by transmitting green light, a third sub-color filter 250c' for implementing a blue color by transmitting blue light, and a fourth sub-color filter 250d' for implementing a yellow color by transmitting yellow light.

As aforementioned, the fourth sub-color filter 250d' may implement a cyan color by transmitting cyan light.

The first to fourth sub-color filters 250a', 250b', 250c' and 250d' implement four colors of RGBY or RGBC by transmitting light of RGBY or RGBC wavelengths and reflecting light of other wavelengths. More concretely, first to fourth sub-wavelength transmissive patterns 253a', 253b', 253c' and 253d' having predetermined periods are formed on first to fourth metal layers 252a', 252b', 252c' and 252d', respectively. And, an electric field of incident light having both a wavelength of near infrared light and a wavelength of visible light is coupled to a plasmon. Accordingly, only light of RGBY or RGBC wavelengths is transmitted, and light of other wavelengths is reflected, thereby obtaining four colors of RGBY or RGBC.

The first to fourth sub-color filters 250a', 250b', 250c' and 250d' of the color filter 250' according to the second embodiment are tangent to one another in a quadrangular shape, and lines connecting centers of the first to fourth sub-color filters to one another form a quadrangle.

However, the present invention is not limited to the four colors of RGBY or RGBC, but may be also applicable to five colors implemented as yellow (Y) and cyan (C) are added to the three colors of RGB.

Figure 8:
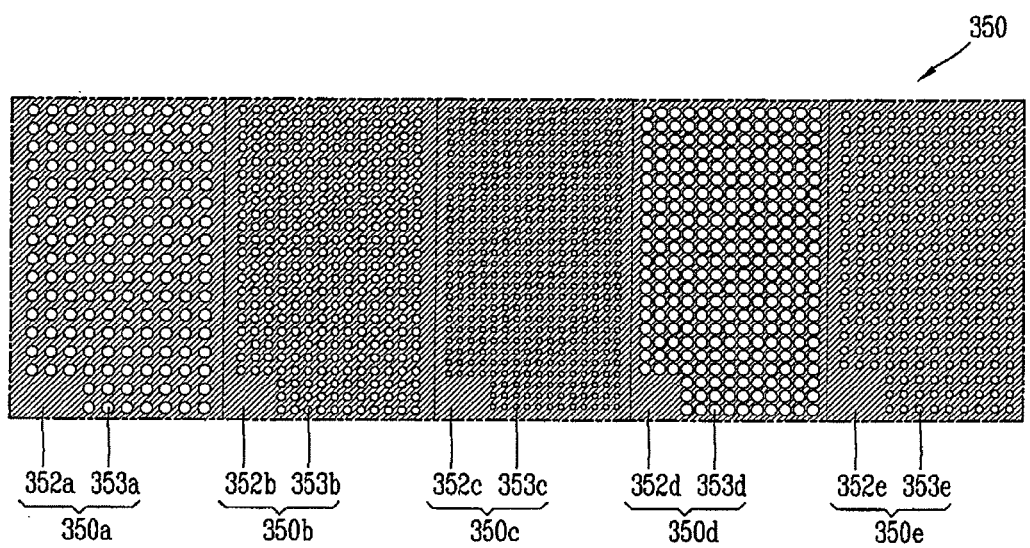
FIG. 8 is a planar view schematically showing one structure of a color filter according to a third embodiment of the present invention.

FIG. 8 is a planar view schematically showing one structure of a color filter according to a third embodiment of the present invention, in which quadrangular-RGBYC sub-color filters are arranged in the form of stripes.

FIG. 8 shows a color filter with respect to one pixel composed of sub-color filters corresponding to red, green, blue, yellow and cyan colors from the left side. However, the present invention is not limited to this.

As shown, the color filter 350 according to the third embodiment of the present invention comprises a first sub-color filter 350a for implementing a red color by transmitting red light, a second sub-color filter 350b for implementing a green color by transmitting green light, a third sub-color filter 350c for implementing a blue color by transmitting blue light, a fourth sub-color filter 350d for implementing a yellow color by transmitting yellow light, and a fifth sub-color filter 350e for implementing a cyan color by transmitting cyan light.

The first to fifth sub-color filters 350a, 350b, 350c, 350d and 350e implement five colors of RGBYC by transmitting light of RGBYC wavelengths and reflecting light of other wavelengths. More concretely, first to fifth sub-wavelength transmissive patterns 353a, 353b, 353c, 353d and 353e having predetermined periods are formed on first to fifth metal layers 352a, 352b, 352c, 352d and 352e respectively. And, an electric field of incident light having both a wavelength of near infrared light and a wavelength of visible light is coupled to a plasmon. Accordingly, only light of RGBYC wavelengths is transmitted, and light of other wavelengths is reflected, thereby obtaining five colors of RGBYC.

Here, the transmitted light has a wavelength corresponding to about 1.7~2 times of a grating period, i.e., the period of the first to fifth transmissive patterns 353a, 353b, 353c, 353d and 353e. As aforementioned, the first to fifth transmissive patterns 353a, 353b, 353c, 353d and 353e may have not only a circular shape such as holes, but also various shapes such as an oval shape, a quadrangular shape, a triangular shape, and a slit shape.

The first to fifth metal layers 352a, 352b, 352c, 352d and 352e may be formed of aluminum, molybdenum, copper, gold, silver, chrome, etc.

The first to fifth transmissive patterns 353a, 353b, 353c, 353d, and 353e are formed in pixel regions except for a region where a gate line, a data line, and a TFT are formed.

The color filter 350 according to the third embodiment of the present invention has a form of stripes as the first to fifth sub-color filters 350a, 350b, 350c, 350d and 350e each having a quadrangular shape are sequentially arranged. However, the present invention is not limited to this. That is, the sub-color filters for implementing five colors of RGBYC may be arranged in a quadrangular shape having therein one diamond-shaped sub color filter.

Figure 9:
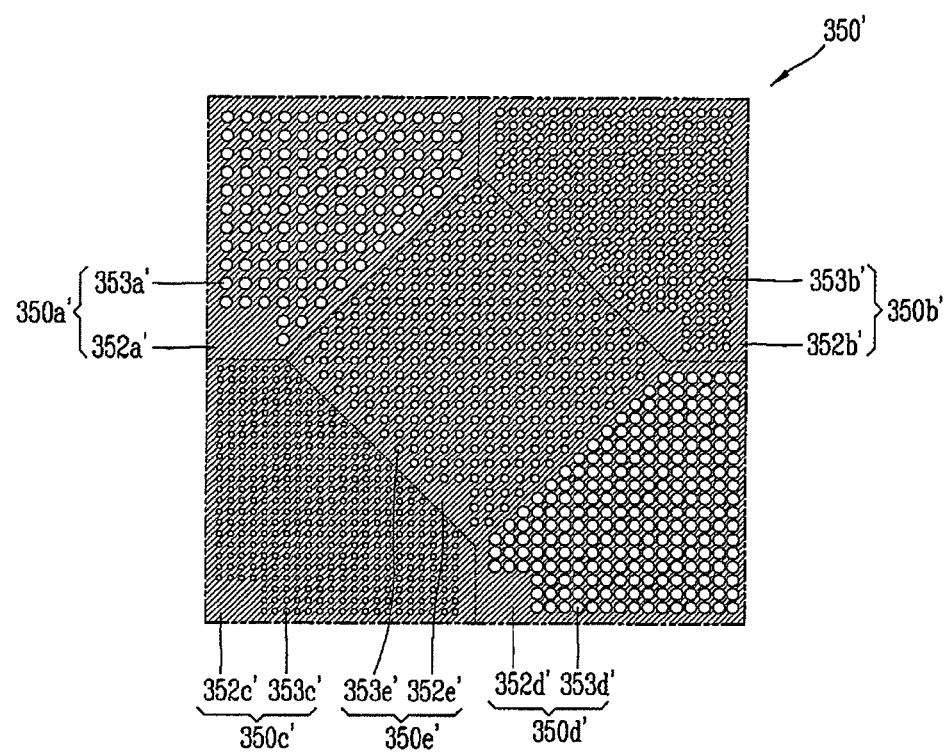
FIG. 9 is a planar view schematically showing another structure of the color filter according to a third embodiment of the present invention.

FIG. 9 is a planar view schematically showing another structure of the color filter according to the third embodiment of the present invention, in which four sub-color filters are arranged in a quadrangular shape having therein one diamond-shaped sub color filter.

The color filter of FIG. 9 according to the third embodiment of the present invention has the same configuration as the color filter of FIG. 8 according to the third embodiment of the present invention except for the shape and the arrangement.

As shown, the color filter 350' according to the third embodiment of the present invention comprises a first sub-color filter 350a' for implementing a red color by transmitting red light, a second sub-color filter 350b' for implementing a green color by transmitting green light, a third sub-color filter 350c' for implementing a blue color by transmitting blue light, a fourth sub-color filter 350d' for implementing a yellow color by transmitting yellow light, and a fifth sub-color filter 350e' for implementing a cyan color by transmitting cyan light The first to fifth sub-color filters 350a', 350b', 350c', 350d' and 350e' implement five colors of RGBYC by transmitting light of RGBYC wavelengths and reflecting light of other wavelengths. More concretely, first to fifth sub-wavelength transmissive patterns 353a', 353b', 353c', 353d' and 353e' having predetermined periods are formed on first to fifth metal layers 352a', 352b', 352c',352d' and 352e', respectively. And, an electric field of incident light having both a wavelength of near infrared light and a wavelength of visible light is coupled to a plasmon. Accordingly, only light of RGBYC wavelengths is transmitted, and light of other wavelengths is reflected, thereby obtaining five colors of RGBYC.

As shown, the color filter 350' according to the third embodiment of the present invention is implemented as the fifth sub-color filter 350e' having a diamond shape is positioned in a quadrangle formed as the first to fourth sub-color filters 350a', 350b', 350c' and 350d' are tangent to one another in a quadrangular shape. However, the present invention is not limited to this. Any one of the first to fourth sub-color filters 350a', 350b', 350c' and 350d' may be positioned in the quadrangle.

Hereinafter, a method for fabricating an LCD device in case of forming the color filter using a surface plasmon according to the first to third embodiments of the present invention on the array substrate will be explained in more detail with reference to the attached drawings.

FIGS. 10A to 10J are sectional views sequentially showing processes for fabricating an LCD device according to the present invention, which show processes for fabricating an LCD device with respect to one sub-pixel for convenience.

Figure 10A:
FIGS. 10A to 10J are sectional views sequentially showing processes for fabricating an LCD device according to one embodiment of the present invention.

As shown in FIG. 10A, a metallic layer 130 is formed on an array substrate 110 formed of a transparent insulating material such as glass.

The metallic layer 130 may be formed of aluminum, molybdenum, copper, gold, silver, chrome, etc.

Figure 10B:
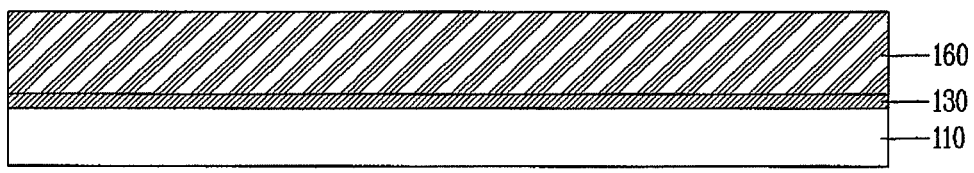
Figure 10C:
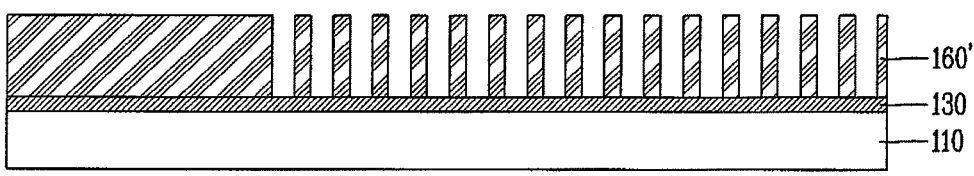

As shown in FIGS. 10B and 10C, a photoresist film 160 is formed on the array substrate 110 having the metallic layer 130 formed thereon, and then is selectively patterned, thereby forming a photoresist film pattern 160'.

Figure 10D:
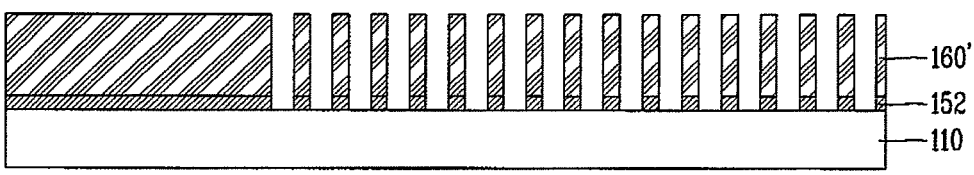

As shown in FIG. 10D, the metallic layer 130 positioned below the photoresist film pattern 160' is selectively patterned by using the photoresist film pattern 160' as a mask, thereby forming a metal layer 152 having a predetermined pattern.

Figure 10E:
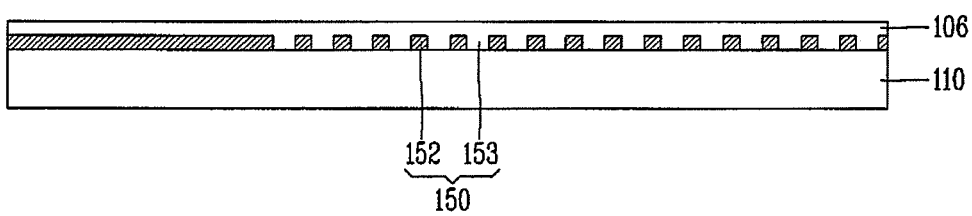

As shown in FIG. 10E, an insulating material is deposited on the metal layer 152 having a predetermined pattern, thereby forming a transmissive pattern 153. And, an insulating layer 106 for planarizing the surface of the color filter 150 is formed on the transmissive pattern 153.

The color filter 150 implements three colors of RGB or multi-colors as the sub-wavelength transmissive pattern 153 having a constant period is formed at the metal layer 152. As the transmissive pattern 153, may be selectively used a transparent polymer having a high transmittance ratio and an excellent optical characteristic, Spin On Glass (SOG), organic or inorganic materials, etc.

The color filter 150 according to the present invention implements RGB colors by selectively transmitting a red color through a red color transmissive pattern inside a red color region, by selectively transmitting a green color through a green color transmissive pattern inside a green color region, and by selectively transmitting a blue color through a blue color transmissive pattern inside a blue color region.

The color filter 150 according to the present invention implements RGBY colors by selectively transmitting a red color through a red color transmissive pattern inside a red color region, by selectively transmitting a green color through a green color transmissive pattern inside a green color region, by selectively transmitting a blue color through a blue color transmissive pattern inside a blue color region, and by selectively transmitting a yellow color through a yellow color transmissive pattern inside a yellow color region.

Alternatively, the color filter 150 according to the present invention implements RGBC colors by selectively transmitting a red color through a red color transmissive pattern inside a red color region, by selectively transmitting a green color through a green color transmissive pattern inside a green color region, by selectively transmitting a blue color through a blue color transmissive pattern inside a blue color region, and by selectively transmitting a cyan color through a cyan color transmissive pattern inside a cyan color region.

Still alternatively, the color filter 150 according to the present invention implements RGBYC colors by selectively transmitting a red color through a red color transmissive pattern inside a red color region, by selectively transmitting a green color through a green color transmissive pattern inside a green color region, by selectively transmitting a blue color through a blue color transmissive pattern inside a blue color region, by selectively transmitting a yellow color through a yellow color transmissive pattern inside a yellow color region, and by selectively transmitting a cyan color through a cyan color transmissive pattern inside a cyan color region.

Figure 10F:
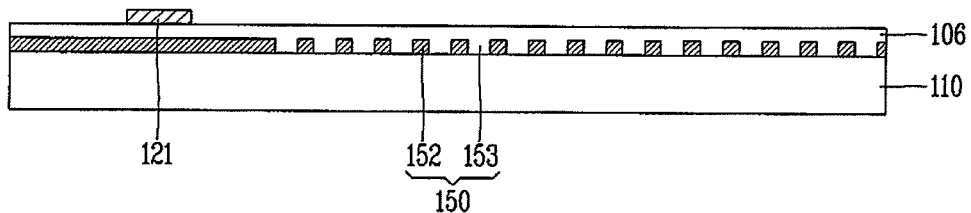

As shown in FIG. 10F, a gate electrode 121 and a gate line (not shown) are formed on the array substrate 110 where the insulating layer 106 has been formed.

Here, the gate electrode 121 and the gate line are formed by depositing a first conductive film on the entire surface of the array substrate 110, and then by selectively pattering the first conductive film by a photolithography process.

The first conductive film may be formed of an opaque conductive material having a low resistance, such as aluminum (Al), Al alloy, tungsten (W), copper (Cu), chromium (Cr), molybdenum (Mo), and Mo alloy. Alternatively, the first conductive film may be formed to have a multi-structure implemented as at least two of the above materials are laminated on each other.

Figure 10G:
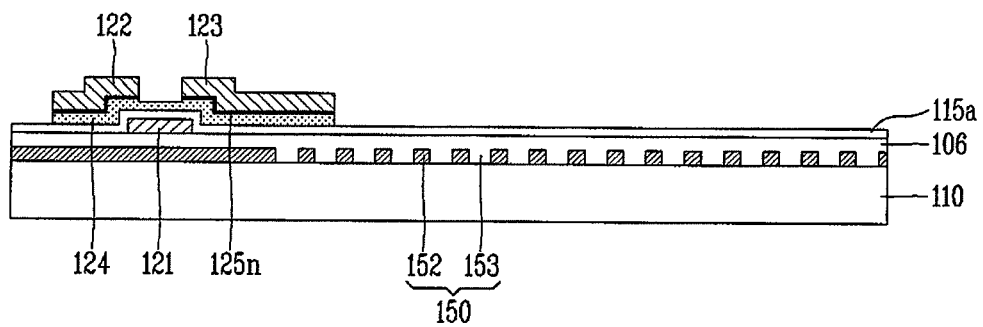

As shown in FIG. 10G, on the entire surface of the array substrate 110 having the gate electrode 121 and the gate line formed thereon, a first insulating layer 115a, an amorphous silicon thin film, an n+ amorphous silicon thin film, and a second conductive film are deposited, and then are selectively removed by a photolithography process. As a result, on the array substrate 110, formed are an active pattern 124 formed of the amorphous silicon thin film, and source/drain electrodes 122 and 123 formed of the second conductive film and electrically connected to source/drain regions of the active pattern 124.

A data line 117 formed of the second conductive film and crossing the gate line to define a pixel region is formed through the photolithography process.

An ohmic contact layer 125n formed of the n+ amorphous silicon thin film and patterned in the same shape as the source/drain electrodes 122 and 123 is formed above the active pattern 124.

The second conductive film may be formed of an opaque conductive material having a low resistance, such as aluminum (Al), Al alloy, tungsten (W), copper (Cu), chromium (Cr), molybdenum (Mo), and Mo alloy, so as to constitute the source/drain electrodes 122 and 123 and the data line. Alternatively, the second conductive film may be formed to have a multi-structure implemented as at least two of the above materials are laminated on each other.

Figure 10H:
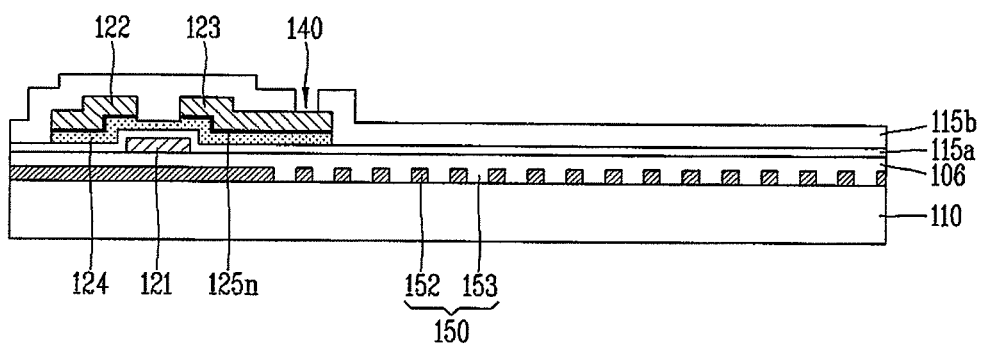

As shown in FIG. 10H, a second insulating layer 115b is formed on the entire surface of the array substrate 110 having the active pattern 124, the source/drain electrodes 122 and 123, and the data line formed thereon. Then, the second insulating layer 115b is selectively removed by a photolithography process, thereby forming, on the array substrate, a contact hole 140 exposing a part of the drain electrode 123.

The second insulating layer 115b may be formed of an inorganic insulating layer such as silicon nitride or silicon oxide, or may be formed of an organic insulating layer such as photoacryl or benzocyclobutene (BCB).

Figure 10I:
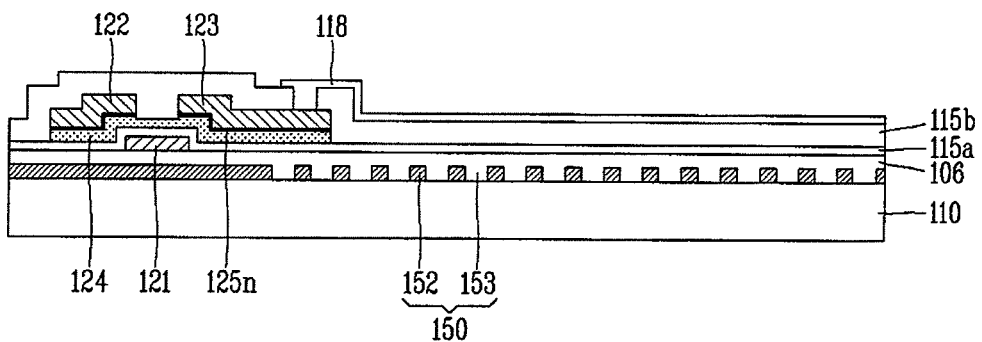

As shown in FIG. 10I, a third conductive film is formed on the entire surface of the array substrate 110 having the second insulating layer 115b formed thereon, and then is selectively removed by a photolithography process. As a result, formed is a pixel electrode 118 electrically connected to the drain electrode 123 through the contact hole 140.

Here, the third conductive film includes a transparent conductive material having a high transmittance ratio, such as Indium Tin Oxide (ITO) or Indium Zinc Oxide (IZO) so as to constitute the pixel electrode.

Figure 10J:
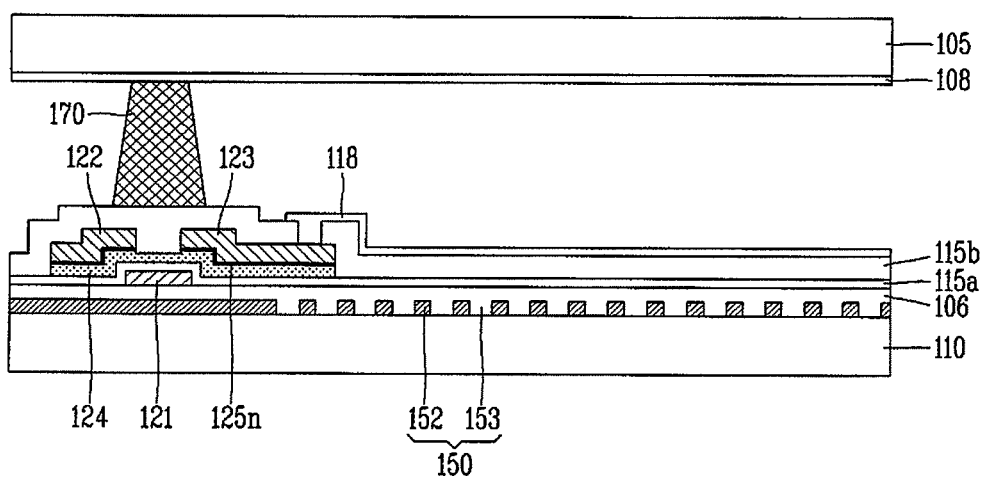

As shown in FIG. 10J, the array substrate 110 and the color filter substrate 105 are bonded to each other with facing each other, by a sealant (not shown) formed on an outer periphery of an image display region, in a state that a constant cell gap is maintained therebetween by a column spacer 170.

In the present invention, the color filter is formed by patterning the metal layer by a general photolithography process. However, the present invention is not limited to this. More concretely, the color filter may be formed by a polymer film transition patterning method using soft molding, capillary force lithography, and rigiflex mold, by a patterning method using UV curing polymer, etc.

FIGS. 11A to 11J are sectional views sequentially showing processes for fabricating an LCD device according to another embodiment of the present invention, in which a conductive film of a color filter is patterned by using a nano-imprinting method.

The processes for fabricating an LCD device shown in FIGS. 11A to 11J according to another embodiment of the present invention are same as the processes for fabricating an LCD device shown in FIGS. 10A to 10J according to one embodiment of the present invention except for a process for forming a color filter.

Figure 11A:
FIGS. 11A to 11J are sectional views sequentially showing processes for fabricating an LCD device according to another embodiment of the present invention.

As shown in FIG. 11A, a metallic layer 230 is formed on an array substrate 210 formed of a transparent insulating material such as glass.

Figure 11B:
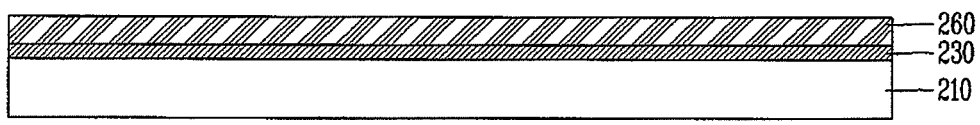
Figure 11C:
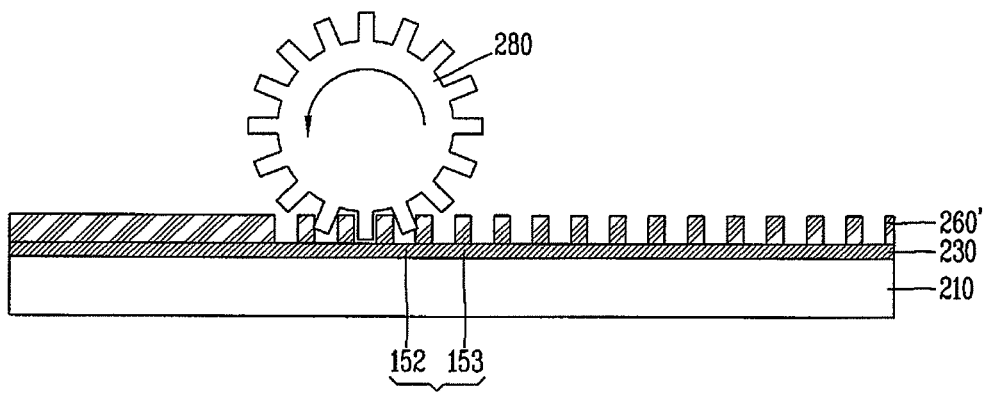

As shown in FIGS. 11B and 11C, a resist layer 260 is formed on the array substrate 210 having the metallic layer 230 formed thereon, and a roller 280 formed of a mold is imprinted to form a resist pattern 260'.

Figure 11D:
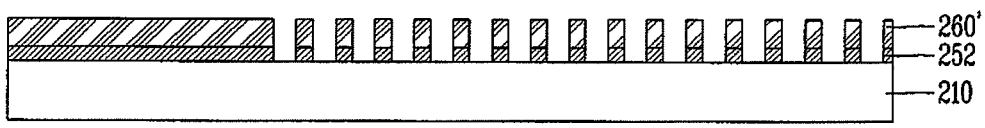

As shown in FIG. 11D, the metallic layer 230 is selectively patterned by using the resist pattern 260' as a mask, thereby forming a metal layer 252 having a predetermined pattern.

Figure 11E:
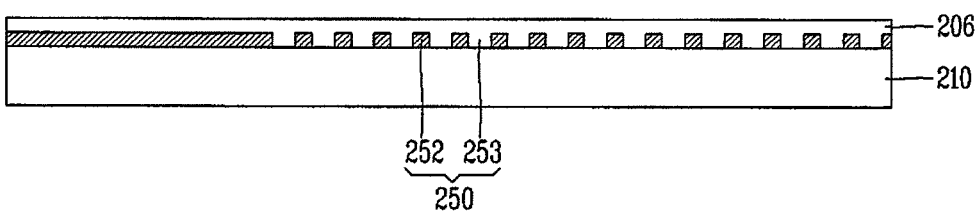

As shown in FIG. 11E, an insulating material is deposited on the metal layer 252 having a predetermined pattern, thereby forming a transmissive pattern 253. And, an insulating layer 206 is formed to planarize the surface of the color filter 250.

Figure 11F:
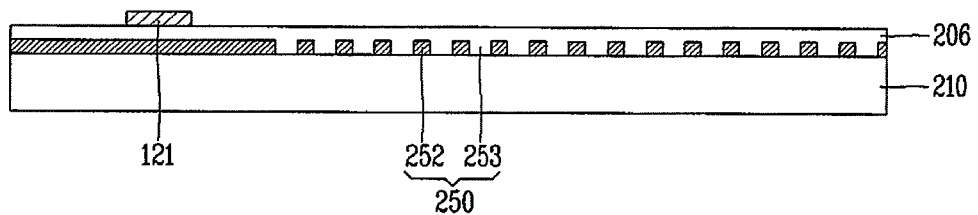

As shown in FIG. 11F, a gate electrode 221 and a gate line (not shown) are formed on the array substrate 210 having the insulating layer 206 formed thereon.

Here, the gate electrode 221 and the gate line are formed by depositing the first conductive film on the entire surface of the array substrate 210, and then by selectively pattering the first conductive film by a photolithography process.

Figure 11G:
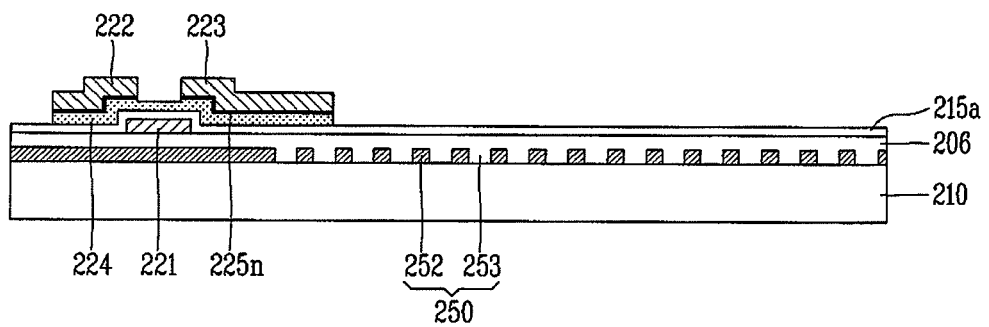

As shown in FIG. 11G, on the entire surface of the array substrate 210 having the gate electrode 221 and the gate line formed thereon, a first insulating layer 215a, an amorphous silicon thin film, an n+ amorphous silicon thin film, and a second conductive film are deposited, and then are selectively removed by a photolithography process. As a result, on the array substrate 210, formed are an active pattern 224 formed of the amorphous silicon thin film, and source/drain electrodes 222 and 223 formed of the second conductive film and electrically connected to source/drain regions of the active pattern 224.

A data line (not shown) formed of the second conductive film and crossing the gate line 216 to define a pixel region is formed through the photolithography process.

An ohmic contact layer 225n formed of the n+ amorphous silicon thin film and patterned in the same shape as the source/drain electrodes 222 and 223 is formed above the active pattern 224.

Figure 11H:
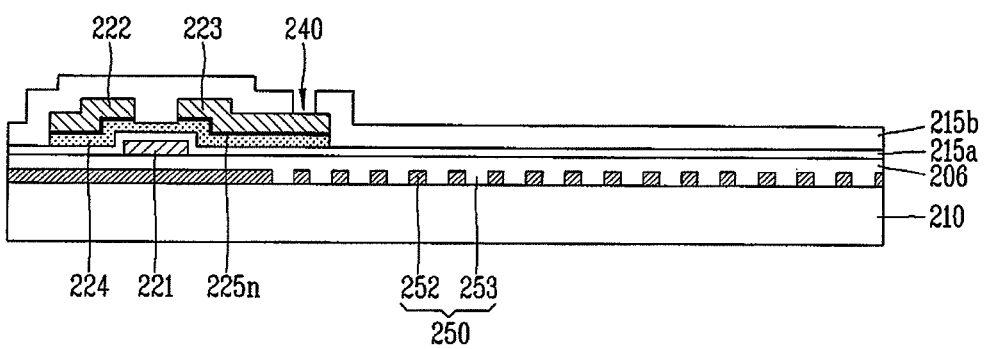

As shown in FIG. 11H, a second insulating layer 215b is formed on the entire surface of the array substrate 210 having the active pattern 224, the source/drain electrodes 222 and 223, and the data line formed thereon. Then, the second insulating layer 215b is selectively removed by a photolithography process, thereby forming, on the array substrate 210, a contact hole 240 exposing a part of the drain electrode 223.

Figure 11I:
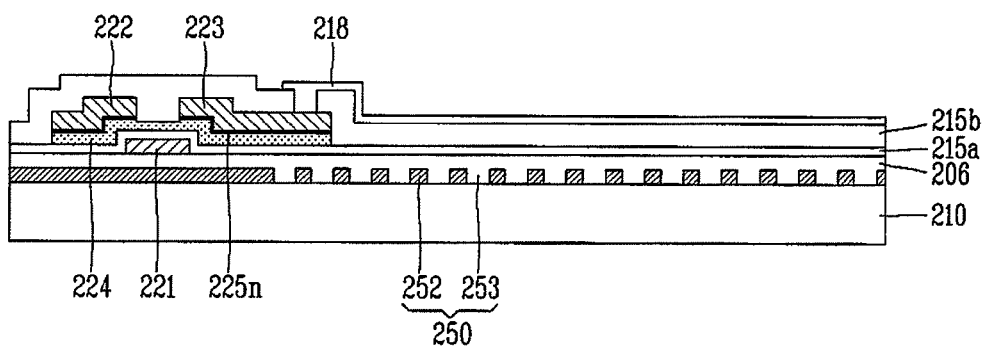

As shown in FIG. 11I, a third insulating layer is formed on the entire surface of the array substrate 210 having the second insulating layer 215b formed thereon. Then, the third insulating layer is selectively removed by a photolithography process, thereby forming a pixel electrode 218 electrically connected to the drain electrode 223 through the contact hole 240.

Figure 11J:
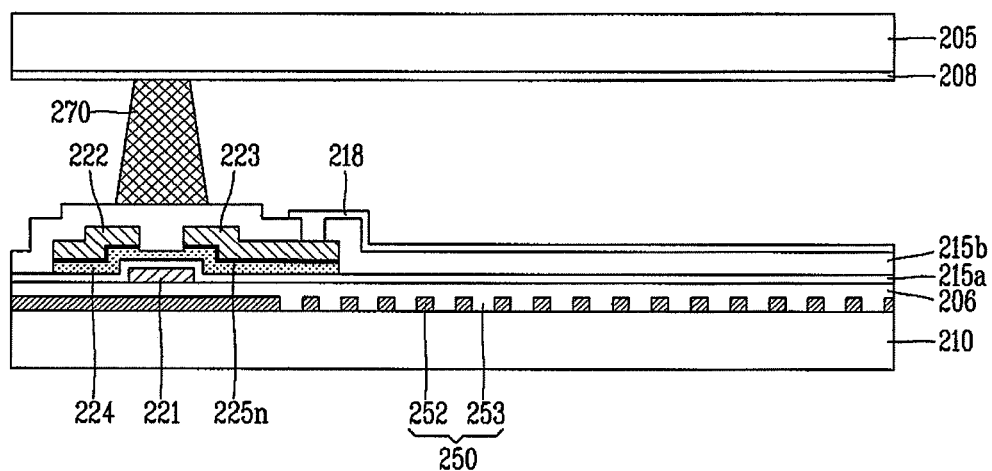

As shown in FIG. 11J, the array substrate 210 is bonded to a color filter substrate 205 with facing each other, by a sealant (not shown) formed on an outer periphery of an image display region, in a state that a constant cell gap is maintained therebetween by a column spacer 270.

In the preferred embodiment, the column spacer and the sealant are formed on the lower array substrate so as to reduce the number of color filter processes. However, the present invention is not limited to this.

In the preferred embodiment, it was explained that the present invention was applied to an amorphous silicon thin film transistor using an amorphous silicon thin film as an active pattern. However, the present invention is not limited to this. That is, the present invention may be also applied to a polycrystalline silicon thin film transistor using a polycrystalline silicon thin film as an active pattern.

The present invention may be applied not only to an LCD device, but also to other display devices fabricated by using thin film transistors, e.g., an OLED display device in which Organic Light Emitting Diodes (OLED) are connected to driving transistors.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
a first substrate;
a color filter formed on the first substrate, for implementing RGB colors by forming, in first to third metal layers, first to third sub-wavelength holes each having a different period,
wherein the metal layers having the sub-wavelength holes are used as the color filter using a surface plasmon occurring from the metal layers, and
wherein each thickness of the metal layer corresponding to each color is differently controlled;
an insulating layer formed on the metal layers including an inside of the sub-wavelength holes and formed of a same dielectric material as that of the first substrate;
a thin film transistor formed on the insulating layer; and
a second substrate bonded to the first substrate with facing the first substrate,
wherein first to third sub-color filters of the color filter are tangent to one another in a hexagonal shape, and lines connecting centers of the first to third sub-color filters to one another form a triangle.

2. The LCD device of claim 1, wherein the first to third metal layers are formed of one of aluminum, molybdenum, copper, gold, silver and chrome.

3. A liquid crystal display (LCD) device, comprising:
a first substrate;
a color filter formed on the first substrate, for implementing RGBY or RGBC colors by forming, in first to fourth metal layers, first to fourth sub-wavelength holes each having a different period,
wherein the metal layers having the sub-wavelength holes are used as the color filter using a surface plasmon occurring from the metal layers, and
wherein each thickness of the metal layer corresponding to each color is differently controlled;
an insulating layer formed on the metal layers including an inside of the sub-wavelength holes and formed of a same dielectric material as that of the first substrate;
a thin film transistor formed on the insulating layer; and
a second substrate bonded to the first substrate with facing the first substrate,
wherein first to fourth sub-color filters of the color filter are tangent to one another in a quadrangular shape, and lines connecting centers of the first to fourth sub-color filters to one another form a quadrangle.

4. The LCD device of one of claims 3, wherein the first to fourth metal layers are formed of one of aluminum, molybdenum, copper, gold, silver and chrome.

5. A liquid crystal display (LCD) device, comprising:
a first substrate;
a color filter formed on the first substrate, for implementing RGBYC colors by forming, in first to fifth metal layers, first to fifth sub-wavelength holes each having a different period,
wherein the metal layers having the sub-wavelength holes are used as the color filter using a surface plasmon occurring from the metal layers, and
wherein each thickness of the metal layer corresponding to each color is differently controlled;
an insulating layer formed on the metal layers including an inside of the sub-wavelength holes and formed of a same dielectric material as that of the first substrate;
a thin film transistor formed on the insulating layer; and
a second substrate bonded to the first substrate with facing the first substrate,
wherein four of first to fifth sub-color filters of the color filter are tangent to one another in a quadrangular shape, and the rest one sub-color filter is positioned inside the quadrangle in a diamond shape.

6. The LCD device of claim 5, wherein the first to fifth metal layers are formed of one of aluminum, molybdenum, copper, gold, silver and chrome.

7. A liquid crystal display (LCD) device, comprising:
a first substrate;
a color filter formed on the first substrate, for implementing RGBYC colors by forming, in first to fifth metal layers, first to fifth sub-wavelength holes each having a different period,
wherein the metal layers having the sub-wavelength holes are used as the color filter using a surface plasmon occurring from the metal layers, and
wherein each thickness of the metal layer corresponding to each color is differently controlled;
an insulating layer formed on the metal layers including an inside of the sub-wavelength holes and formed of a same dielectric material as that of the first substrate;
a thin film transistor formed on the insulating layer; and
a second substrate bonded to the first substrate with facing the first substrate,
wherein first to fifth sub-color filters of the color filter are sequentially arranged in a quadrangular shape to have a form of stripes.

8. The LCD device of claim 7, wherein the first to fifth metal layers are formed of one of aluminum, molybdenum, copper, gold, silver and chrome.

* * * * *